(12) United States Patent
Bell

(10) Patent No.: US 11,932,761 B2
(45) Date of Patent: Mar. 19, 2024

(54) HFCO-CONTAINING ISOCYANATE-REACTIVE COMPOSITIONS, POLYURETHANE FOAMS FORMED THEREFROM, AND COMPOSITE ARTICLES THAT INCLUDE SUCH FOAMS

(71) Applicant: Covestro LLC, Pittsburgh, PA (US)

(72) Inventor: Michael H. Bell, Morgantown, WV (US)

(73) Assignee: Covestro LLC, Pittsburgh, PA (US)

( * ) Notice: Subject to any disclaimer, the term of this patent is extended or adjusted under 35 U.S.C. 154(b) by 262 days.

(21) Appl. No.: 17/170,046

(22) Filed: Feb. 8, 2021

(65) Prior Publication Data
US 2022/0251374 A1   Aug. 11, 2022

(51) Int. Cl.
*C08L 71/02*   (2006.01)
*B32B 5/20*   (2006.01)
(Continued)

(52) U.S. Cl.
CPC ............ *C08L 71/02* (2013.01); *B32B 5/20* (2013.01); *B32B 15/046* (2013.01); *B32B 15/095* (2013.01); *C08G 18/14* (2013.01); *C08G 18/163* (2013.01); *C08G 18/168* (2013.01); *C08G 18/1808* (2013.01); *C08G 18/225* (2013.01); *C08G 18/4816* (2013.01); *C08G 18/7692* (2013.01); *C08J 9/122* (2013.01); *C08J 9/144* (2013.01); *B32B 2250/03* (2013.01); *B32B 2250/40* (2013.01); *B32B 2307/304* (2013.01); *C08G 2101/00* (2013.01); *C08G 2110/0025* (2021.01); *C08J 2203/02* (2013.01);
(Continued)

(58) Field of Classification Search
None
See application file for complete search history.

(56) References Cited

U.S. PATENT DOCUMENTS 3,161,682 A   12/1964   Lesesne et al.
4,094,846 A   6/1978   DeLapp
(Continued)

FOREIGN PATENT DOCUMENTS

CN   103804711 A   5/2014
CN   104497251 A   4/2015
(Continued)

OTHER PUBLICATIONS

G. Oertel, Polyurethane Handbook, 2nd Edition, 1994, pp. 253-256, Hanser/Gardner Publications Inc., Cincinnati.
(Continued)

*Primary Examiner* — Jeffrey D Washville
(74) *Attorney, Agent, or Firm* — Donald R. Palladino

(57) ABSTRACT

Isocyanate-reactive compositions, rigid polyurethane foam-forming compositions, rigid polyurethane foams, and methods for their production, and composite articles having a rigid polyurethane foam sandwiched between metal facer substrates. The rigid polyurethane foams are produced from an isocyanate-reactive composition comprising: (1) a polyol blend that includes an amine-initiated polyether polyol; (2) a hydrochlorofluoroolefin ("HCFO"); and (3) a catalyst that includes an arylalkyl tertiary amine, an aryl tertiary amine, or a mixture thereof. The foam can have excellent adhesion to metal substrates.

15 Claims, 1 Drawing Sheet

(51) Int. Cl.
*B32B 15/04* (2006.01)
*B32B 15/095* (2006.01)
*C08G 18/08* (2006.01)
*C08G 18/16* (2006.01)
*C08G 18/18* (2006.01)
*C08G 18/22* (2006.01)
*C08G 18/48* (2006.01)
*C08G 18/76* (2006.01)
*C08G 101/00* (2006.01)
*C08J 9/12* (2006.01)
*C08J 9/14* (2006.01)

(52) U.S. Cl.
CPC .... *C08J 2203/142* (2013.01); *C08J 2203/182* (2013.01); *C08J 2205/10* (2013.01); *C08J 2375/08* (2013.01)

(56) References Cited

U.S. PATENT DOCUMENTS

| | | |
|---|---|---|
| 5,690,855 A | 11/1997 | Nichols et al. |
| 9,051,442 B2 | 6/2015 | Williams et al. |
| 9,453,115 B2 | 9/2016 | Williams et al. |
| 9,550,854 B2 | 1/2017 | Van Der Puy et al. |
| 9,556,303 B2 | 1/2017 | Ross et al. |
| 10,479,862 B2 | 11/2019 | Adkins et al. |
| 10,640,600 B2 | 5/2020 | Rider et al. |
| 10,752,725 B2 | 8/2020 | Rider et al. |
| 2005/0208005 A1 | 9/2005 | Giroud |
| 2007/0173556 A1 | 7/2007 | Prange et al. |
| 2012/0116114 A1* | 5/2012 | Nefzger ............. C08G 18/4261 560/182 |
| 2012/0172476 A1 | 7/2012 | Costa et al. |
| 2012/0202904 A1 | 8/2012 | Chen et al. |
| 2012/0220677 A1 | 8/2012 | Williams et al. |
| 2013/0041048 A1 | 2/2013 | Chen et al. |
| 2014/0005288 A1* | 1/2014 | Chen ................. C08G 18/4018 521/170 |
| 2014/0051776 A1 | 2/2014 | Chen et al. |
| 2014/0371338 A1 | 12/2014 | Chen et al. |
| 2016/0130416 A1 | 5/2016 | Chen et al. |
| 2017/0002165 A1* | 1/2017 | Riccio ................... C08G 18/14 |
| 2017/0081491 A1 | 3/2017 | Chen et al. |
| 2017/0158801 A1 | 6/2017 | Rider et al. |
| 2018/0079881 A1* | 3/2018 | Zhang ................. C08G 18/163 |
| 2018/0134861 A1 | 5/2018 | Schilling |
| 2020/0123302 A1* | 4/2020 | Ogonowski .......... C08G 18/482 |
| 2020/0283561 A1 | 9/2020 | Parks |
| 2020/0339732 A1 | 10/2020 | Kember et al. |
| 2020/0362088 A1 | 11/2020 | Wei et al. |
| 2022/0163162 A1* | 5/2022 | Tomasi ............. C08G 18/1816 |
| 2022/0325026 A1* | 10/2022 | Burdeniuc ........... C08G 18/092 |

FOREIGN PATENT DOCUMENTS

| | | |
|---|---|---|
| WO | 2013081809 A1 | 6/2013 |
| WO | 2019209794 A1 | 10/2019 |
| WO | 2020002104 A1 | 1/2020 |
| WO | 2020201312 A1 | 10/2020 |

OTHER PUBLICATIONS

The Dow Chemical Company, Dow Answer Center, Answer ID 5659 updated Jul. 25, 2017.

* cited by examiner

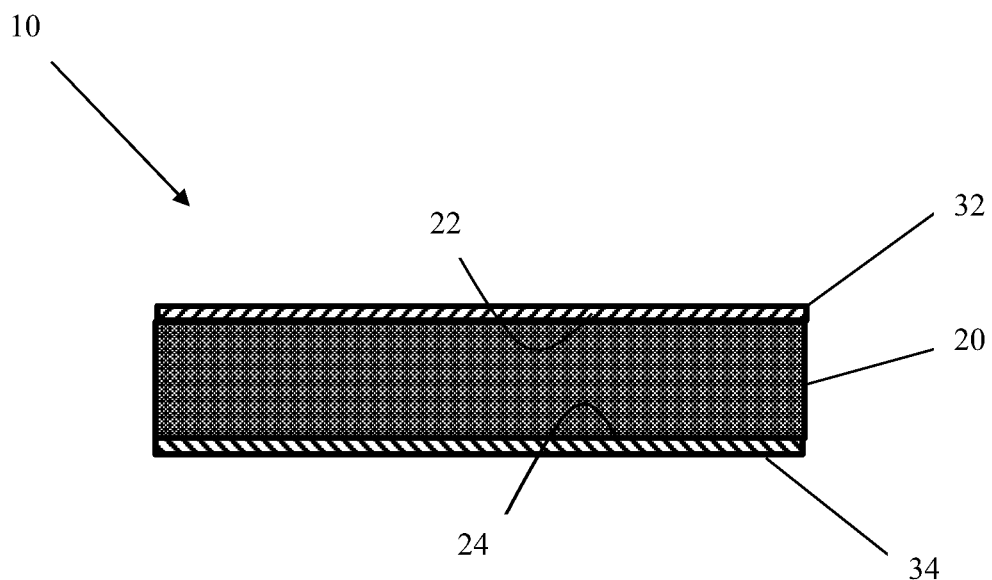

HFCO-CONTAINING ISOCYANATE-REACTIVE COMPOSITIONS, POLYURETHANE FOAMS FORMED THEREFROM, AND COMPOSITE ARTICLES THAT INCLUDE SUCH FOAMS

FIELD

This specification pertains generally to isocyanate-reactive compositions, rigid polyurethane foam-forming compositions, rigid polyurethane foams, and methods for their production, as well as to composite articles comprising such foams sandwiched between metal facer substrates. The rigid polyurethane foams are produced from an isocyanate-reactive composition comprising: (1) a polyol blend; (2) a hydrochlorofluoroolefin ("HCFO"); and (3) a catalyst comprising an arylalkyl tertiary amine, an aryl tertiary amine, or a mixture thereof.

BACKGROUND

Rigid polyurethane foams are used in numerous industries and are produced by reacting an appropriate polyisocyanate and an isocyanate-reactive compound, usually a polyol, in the presence of a blowing agent. One use of such foams is as a thermal insulation medium in the construction of entry doors for buildings. The thermal insulating properties of closed-cell rigid foams are dependent upon a number of factors, including the average cell size and the thermal conductivity of the contents of the cells. Chlorofluorocarbons ("CFCs") were typically used as blowing agents to produce these foams because of their exceptionally low vapor thermal conductivity. However, CFCs are now known to contribute to the depletion of ozone in the stratosphere and, as a result, mandates have been issued which prohibit their use.

Initially, the most promising alternatives to CFC's appeared to be hydrogen-containing chlorofluorocarbons ("HCFCs"). While HCFCs, such as HCFC 141b, have been used as alternatives to CFCs, they have also been found to have some ozone-depletion potential. There is, therefore, a desire to find substitutes for HCFCs and CFCs.

Alternative blowing agents, such as hydrofluorocarbons ("HFCs"), also replaced CFCs. The compounds are, however, greenhouse gases. Hydrocarbons, such as pentane isomers, have also been used but these are flammable and have lower energy efficiency. Halogenated hydroolefinic compounds, such as HCFOs, have emerged as replacements for HFCs, since their chemical instability in the lower atmosphere provides for a low global warming potential and zero or near zero ozone depletion.

A drawback to some HCFOs as blowing agents in the production of satisfactory isocyanate-based foams, however, is shelf-life issues. Blowing agents usually are combined with polyols and other components, such as surfactant(s) and catalyst(s) to form a so-called "B-side" pre-mix that may be stored for up to several months prior to being combined with an "A-side" isocyanate component to form the foam. A drawback of systems that use certain HCFOs is the shelf-life of the B-side composition. If the B-side composition is aged prior to combining with the polyisocyanate, the foam can be of lower quality and may even collapse during formation. The poor foam structure is thought to be attributable to the reaction of certain catalysts with these HCFOs which results in the partial decomposition of the blowing agent and, as a result, undesirable modification of silicone surfactants, resulting in poor foam structure and quality.

To combat this issue, certain amine catalysts have been identified that can exhibit substantially improved stability with HCFOs. Such catalysts, however, are not without some drawbacks. In addition to being relatively costly, they tend to be weak catalysts, thereby necessitating their use in relatively high loadings, which both amplifies the cost impact and limits the ability of a foam formulator to optimize the foam flow profile and quality. This can result in compromised performance, such as the ability of the resulting polyurethane foam to adhere to metallic facer substrates.

Foam-forming compositions used in the production of discontinuous panel insulation, such as insulation for entry doors, must exhibit a stringent combination of properties. For example, in addition to good thermal insulation properties, they must exhibit a target gel time conducive to the manufacturing equipment and process that is used, and they must exhibit a long shelf life, which means that this gel time cannot change by a large amount after storage of the foam-forming composition components for a long period of time (several months or more), even when water is used as a blowing agent component in an amount of 2% by weight or more, based on the total weight of the isocyanate-reactive composition. They also must exhibit good dimensional stability (low foam shrinkage) even when the free-rise foams have a relatively low density of 1.4 to 1.7 lb/ft$^3$ (22.4 to 27.2 kg/m$^3$). In addition, it is important that the foam adheres well to metal facer substrates typically used in entry door applications, such as steel.

A composition that can fulfill most, if not all, of these requirements, while utilizing a HCFO blowing agent would, therefore, before highly desirable.

The inventions described in this specification were made in view of the foregoing.

SUMMARY

In certain respects, the present disclosure is directed to isocyanate-reactive compositions. These isocyanate-reactive compositions comprise: (a) a polyol blend; (b) a blowing agent composition; and (c) a catalyst composition. The polyol blend comprises 1 to 20% by weight, based on the total weight of the polyol blend, of an amine-initiated polyether polyol having an OH number of at least 500 mg KOH/g and a functionality of 2.5 to 4. The blowing agent composition comprises: (1) a HCFO; and (2) a carbon dioxide generating chemical blowing agent. The catalyst composition comprises: (1) a gel catalyst; and (2) a blow catalyst, in which (i) the gel catalyst comprises an arylalkyl tertiary amine, an aryl tertiary amine, or a mixture thereof that is present in an amount of at least 1% by weight, based on the total weight of the polyol blend; and (ii) the blow catalyst and gel catalyst are present in a relative ratio, by weight, of at least 1:1.

The present specification is also directed to rigid polyurethane foams produced from such compositions and methods for making such rigid polyurethane foams.

In other implementations, this disclosure relates to composite articles. These composite articles comprise a rigid polyurethane foam core comprising a first face adhered to first metal substrate and a second face adhered to a second metal substrate. In these articles, the rigid polyurethane foam core comprises the reaction product of a reaction mixture comprising: (a) a polyol blend; (b) a blowing agent composition; (c) a tertiary amine catalyst; and (d) a polyisocyanate. The polyol blend comprises 1 to 20% by weight, based on the total weight of the polyol blend, of an amine-initiated polyether polyol having an OH number of at least 500 mg KOH/g and a functionality of 2.5 to 4. The blowing agent composition comprises: (1) a HCFO; and (2) a carbon dioxide generating chemical blowing agent. The tertiary amine catalyst comprises an arylalkyl tertiary amine, an aryl tertiary amine, or a mixture thereof. The polyisocyanate is present in an amount sufficient to provide an isocyanate index of 0.90 to 1.80. The rigid foam exhibits an adhesive strength to at least one of the first metal substrate and the second metal substrate of at least 1.7 lbf/in when measured according to ASTM D429-14, Method B.

BRIEF DESCRIPTION OF THE DRAWING

Various features and characteristics of the inventions described in this specification may be better understood by reference to the accompanying FIGURE, in which:

FIG. 1 is a schematic illustration of a cross-section of a composite article according to certain implementations.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the polyol or polyol blend that is being described. In the production of polyurethane foams, the hydroxyl groups react with isocyanate groups, —NCO, that are attached to a polyisocyanate. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol—Equivalent Weight (g/eq)=(56.1×1000)/OH number.

As indicated, certain embodiments of the present specification are directed to producing rigid foams. A rigid foam is characterized as having a ratio of compressive strength to tensile strength of at least 0.5:1, elongation of less than 10%, as well as a low recovery rate from distortion and a low elastic limit, as described in in "Polyurethanes: Chemistry and Technology, Part II Technology," J. H. Saunders & K. C. Frisch, Interscience Publishers, 1964, page 239.

In some implementations, this specification is directed to isocyanate-reactive compositions that comprise a polyol blend. More specifically, the polyol blend of the isocyanate-reactive compositions of this specification comprises an amine-initiated polyether polyol. In some implementations, the amine-initiated polyether polyol comprises an alkanolamine-initiated polyether polyol. As used herein, "alkanolamine-initiated polyether polyol" refers to a polyether polyol prepared by reacting at least one alkylene oxide with one or more suitable initiator compounds in the presence of a suitable catalyst, in which the initiator compounds comprise one or more alkanolamines. Suitable catalysts including basic catalysts (such as sodium or potassium hydroxide or tertiary amines such as methyl imidazole) and DMC catalysts. In the polyol blends described herein, each of the recited polyether polyols, including the "alkanolamine-initiated polyether polyol" are different from each other.

As used herein, the term "alkanolamine" refers to compounds represented by the formula:

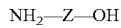

in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms. The dialkylene ether radical may be represented by the formula:

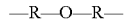

where each R represents a hydrocarbon radical having 2 to 3 carbon atoms.

Specific examples of suitable alkanolamines that may be used in the preparation of the alkanolamine-initiated polyether polyol include monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2, 2-dimethyl propanol, 4-aminocyclohexanol, as well as mixtures of any two or more thereof.

To prepare the alkanolamine-initiated polyether polyol, the alkanolamine is reacted with an alkylene oxide. Suitable alkylene oxides include ethylene oxide, propylene oxide, butylene oxide, styrene oxide, and epichlorohydrin, as well as mixtures of any two or more thereof.

In some implementations, the amine-initiated polyether polyol, such as the alkanolamine-initiated polyether polyol, has an OH number of at least 500 mg KOH/g, such as 500 to 900 mg KOH/g, 600 to 800 mg KOH/g, or, in some cases, 680 to 720 mg KOH/g, and a functionality of 2.5 to 4, such as 2.5 to 3.5.

Moreover, in the isocyanate-reactive compositions of this specification, the amine-initiated polyether polyol, such as an alkanolamine-initiated polyether polyol, is present in an amount of 1 to 20%, such as 5 to 20% by weight, 10 to 20% by weight, or 10 to 15% by weight, based upon the total weight of the polyol blend.

The polyol blend comprises one or more additional polyols. For example, in some implementations, the polyol blend comprises a saccharide-initiated polyether polyol that is different from the previously described amine-initiated polyether polyol. As used herein, "saccharide-initiated polyether polyol" refers to a polyether polyol prepared by reacting at least one alkylene oxide with one or more suitable initiator compounds in the presence of a suitable catalyst, in which the initiator compounds comprise one or more saccharides. Examples of suitable alkylene oxides include ethylene oxide, propylene oxide, butylene oxide, styrene oxide, epichlorohydrin, or mixtures thereof, etc. Some examples of suitable saccharide initiators are sucrose, sorbitol, maltitol, and mixtures thereof, as well as other mono-saccharides, di-saccharides, tri-saccharides and poly-saccharides. Other initiator compounds are often used in combination with the saccharide initiator to prepare the saccharide-initiated polyether polyol. Saccharides can be co-initiated with for example, compounds such as water, propylene glycol, glycerin, ethylene glycol, ethanol amines, diethylene glycol, and mixtures thereof, to form a saccharide-initiated polyether polyol. As will be appreciated, it is possible to use a wide variety of individual initiator compounds in combination with one another in which the functionality of the individual initiator compounds does not fall within the functionalities set forth herein, provided that the average functionality of the mixture of initiator compounds satisfies the overall functionality range disclosed herein.

Some examples of suitable catalysts which can be used include basic catalysts (such as sodium or potassium hydroxide or tertiary amines such as methyl imidazole), and double metal cyanide (DMC) catalysts.

In some embodiments, the saccharide-initiated polyether polyol has an OH number of 200 to 600 mg KOH/g, such as 300 to 550 mg KOH/g, such as 350 to 450 mg KOH/g, or, in some cases, 380 to 420 mg KOH/g, and a functionality of 4 to 6, such as 4 to 5, or 4.0 to 4.5.

More particularly, in certain embodiments, saccharide-initiated polyether polyol is present in an amount of 20 to 99% by weight, such as 20 to 90% by weight, 20 to 80% by weight, 20 to 60% by weight, or, in some cases, 30 to 50% by weight, based on the total weight of the polyol blend.

In some implementations, the polyol blend comprises an aliphatic triol-initiated polyether polyol that is different from the saccharide-initiated polyether polyol and amine-initiated polyether polyol described earlier, such as those having an OH number of 200 to 800 mg KOH/g, such as 300 to 600 mg KOH/g, 400 to 500 mg KOH/g, or 450 to 500 mg KOH/g, and a functionality of from greater than 2 to 4, such as 2.5 to 3.5, or, in some cases, 3.0.

Aliphatic triol-initiated polyether polyols can be prepared by reacting suitable aliphatic divalent, trivalent and/or more valent alcohols, (e.g., ethanediol, propanediol-1,2 and propanediol-1,3, diethylene glycol, dipropylene glycol, butanediol-1,4, hexanediol-1,6, and glycerin), provided that at least one trivalent alcohol is used. In some embodiments, the polyvalent alcohol starter comprises or, in some cases, consists of glycerin and the alkylene oxide comprises, or, in some cases, consists of propylene oxide.

In certain embodiments, the aliphatic triol-initiated polyether polyol is utilized in an amount of 20 to 99% by weight, such as 20 to 90% by weight, or 20 to 80% by weight, 20 to 60% by weight, or, in some cases, 30 to 50% by weight, based on the total weight of the polyol blend.

In certain embodiments, the polyol blend comprises both saccharide-initiated polyether polyol and aliphatic triol-initiated polyether polyol, in which saccharide-initiated polyether polyol and aliphatic triol-initiated polyether polyol are present in the polyol blend in a weight ratio of 1:10 to 10:1, such as 1:5 to 5:1, 1:3 to 3:1, 1.2:2.1, in some cases, 1.5:1.0 to 1.0:1.5 or 1.2:1.0 to 1.0:1.2.

In some implementations, the polyol blend comprises a saccharide-initiated polyether polyol as described above, in which the saccharide-initiated polyether polyol and the alkanolamine-initiated polyether polyol are present in the polyol blend at a weight ratio of at least 1:1, such as 1:1 to 10:1, or 1:1 to 5:1; 2:1 to 4:1 or 3:1 to 4.1. In some implementations, the polyol blend comprises an aliphatic triol-initiated polyether polyol as described above, in which the aliphatic triol-initiated polyether polyol and the alkanolamine-initiated polyether polyol are present in the polyol blend at a weight ratio of at least 1:1, such as 1:1 to 10:1, or 1:1 to 5:1; 2:1 to 4:1 or 3:1 to 4.1.

The polyol blend may, if desired, comprise any of a variety of other polyols and may, if desired, include other compound with isocyanate-reactive groups, such as chain extenders and/or crosslinking agents, and higher molecular weight polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, and diethyltoluenediamine. Polyester polyols may be prepared from, for example, an organic dicarboxylic acid having 2 to 12 carbon atoms, such as an aliphatic dicarboxylic acid having 4 to 6 carbon atoms, and a polyvalent alcohol, such as a diol or triol having 2 to 12 carbon atoms. Examples of the dicarboxylic acid are succinic acid, glutaric acid, adipic acid, suberic acid, azelaic acid, sebacic acid, decanedicarboxylic acid, maleic acid, fumaric acid, phthalic acid, isophthalic acid and terephthalic acid. Instead of a free dicarboxylic acid, a corresponding dicarboxylic acid derivative such as a dicarboxylic acid monoester or diester prepared by esterification with an alcohol having 1 to 4 carbon atoms or dicarboxylic anhydride can be used.

In certain embodiments, the polyol blend has a weighted average functionality of from 3 to 6, such as 3 to 5 or 3 to 4, and/or a weighted average hydroxyl number of 300 to 600 mg KOH/g, such as 400 to 500 mg KOH/g, or 450 to 500 mg KOH/g, and/or a weighted average molecular weight of 200 to 800 g/mol, such as 200 to 600 g/mol or 400 to 500 g/mol.

The isocyanate-reactive composition of this specification comprise a blowing agent composition. The blowing agent composition comprises: (1) a physical blowing agent comprising a HCFO; and (2) a carbon dioxide generating chemical blowing agent.

Suitable HCFOs include, for example, 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), and 2-chloro-1,1,1,3,4,4,4-heptafluorobutene-2 (E and/or Z isomers), as well as mixtures of any two or more thereof. In some implementations, the boiling point, at atmospheric pressure, of the HCFO is at least −25° C., at least −20° C., or, in some cases, at least −19° C., and 40° C. or less, such as 35° C. or less, or, in some cases 33° C. or less. The HCFO may have a boiling point, at atmospheric pressure, of, for example, −25° C. to 40° C., or −20° C. to 35° C., or −19° C. to 33° C.

In some implementations, the HCFO is utilized in an amount of at least 1% by weight, such as 5 to 30% by weight, such as 5 to 20% by weight, 5 to 15% by weight or 10 to 15% by weight, based on the total weight of the polyol blend.

In certain implementations, the isocyanate-reactive composition comprises one or more other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane). In other embodiments, the isocyanate-reactive composition is substantially or, in some cases, completely free, of other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane). As used herein, the term "substantially free" when used with reference to these blowing agents, means that the blowing agent is present, if at all, in an amount of less than 10% by weight, such as less than 1% by weight, based on the total weight of the blowing agent composition.

As indicated above, the isocyanate-reactive composition comprises a carbon dioxide generating chemical blowing agent, such as water and/or a formate-blocked amine.

In some of these implementations, the carbon dioxide generating chemical blowing agent, such as water, is utilized in an amount of 0.5 to 10.0% by weight, 2 to 8% by weight, 3.0 to 7.0% by weight, or 4.0 to 6.0% by weight, based on the total weight of the polyol blend.

In certain implementations, the blowing agent composition comprises HCFO and a carbon dioxide generating chemical blowing agent, such as water, wherein the HCFO and the carbon dioxide generating chemical blowing agent are present in an amount of at least 90% by weight, such as at least 95% by weight, or, in some cases, at least 99% by weight, based on the total weight of the blowing agent composition. In certain implementations, the HCFO and a carbon dioxide generating chemical blowing agent are present in the blowing agent composition at a weight ratio of at least 2:1, such as 2:1 to 10:1, 2:1 to 4:1 or 2:1 to 3:1.

If desired, the blowing agent composition may include other physical blowing agents, such as (a) other hydrofluoroolefins (HFOs), such as pentafluoropropane, tetrafluoropropene, 2,3,3,3-tetrafluoropropene, 1,2,3,3-tetrafluoropropene, trifluoropropene, tetrafluorobutene, pentafluorobutene, hexafluorobutene, heptafluorobutene, heptafluoropentene, octafluoropentene, and nonafluoropentene; (b) hydrofluorocarbons (c) hydrocarbons, such as any of the pentane isomers and butane isomers; (d) hydrofluoroethers (HFEs); (e) $C_1$ to $C_5$ alcohols, $C_1$ to $C_4$ aldehydes, $C_1$ to $C_4$ ketones, $C_1$ to $C_4$ ethers and carbon dioxide. Specific examples of such blowing agents are described in United States Patent Application Publication No. US 2014/0371338 A1 at [0051] and [0053], the cited portion of which being incorporated herein by reference.

In some implementations, the isocyanate-reactive composition also comprises a surfactant. Any suitable surfactant can be used including organosilicon compounds, such as polysiloxane-polyalkyene-block copolymers, such as a polyether-modified polysiloxane. Other useful surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. In some embodiments, surfactant is utilized in an amount of 0.2 to 5.0% by weight, such as 1 to 3% by weight, based on the total weight of the polyol blend.

As previously indicated, the isocyanate-reactive composition further comprises a tertiary amine catalyst comprising a gel catalyst comprising an arylalkyl tertiary amine, an aryl tertiary amine, or a mixture thereof. As will be appreciated, a "gel catalyst" refers to a catalyst that has a greater effect on the urethane-forming reaction of a polyol and polyisocyanate than it does on the water-polyisocyanate blowing reaction. Suitable arylalkyl tertiary amines include N,N-dialkylbenzylamines, such as those where each alkyl group of the N,N-dialkylbenzylamine independently contains 1 to 6 carbon atoms, such as where each alkyl group is independently methyl, ethyl, or propyl. In particular, in some implementations, the N,N,-dialkylbenzylamine comprises N,N-dimethylbenzylamine (CAS No. 103-83-3), N,N-diethylbenzylamine, or a combination thereof. Another suitable arylalkyl tertiary amine is dibenzylethylamine. Suitable aryl tertiary amines included, for example, N,N-dimethylaniline, N,N-diethylaniline, N-methyl-N-ethylaniline, N,N-diisopropylaniline, or a mixture of any two or more thereof.

In some implementations, the arylalkyl tertiary amine, an aryl tertiary amine, or a mixture thereof is present in an amount of at least 1% by weight, such as 1 to 5% by weight, or 1.5 to 3.2% by weight, based on the total weight of the polyol blend.

In some implementations, tertiary amine catalyst composition further comprises a "blow catalyst" that has a greater effect on the water-polyisocyanate blowing reaction than it does on the polyol-polyisocyanate urethane-forming reaction. More specifically, however, in some implementations such "blow catalyst" is selected such that its presence does not detrimentally effect the shelf-life stability of the isocyanate-reactive composition. As a result, in some implementations, the blow catalyst comprises a morpholine. Suitable morpholine catalysts include, for example, dimorpholinodiethylether, dimorpholinodimethylether, N-ethylmorpholine, and N-methylmorpholine.

In some implementations, the catalyst composition comprises: (1) a gel catalyst; and (2) a blow catalyst, in which (i) the gel catalyst comprises an arylalkyl tertiary amine, an aryl tertiary amine, or a mixture thereof that is present in an amount of at least 1% by weight, based on the total weight of the polyol blend; and (ii) the blow catalyst and gel catalyst are present in a relative ratio, by weight, of at least 1:1. Moreover, in some implementations, the tertiary amine catalyst composition comprises: (i) 50 to 90% by weight, such as 50 to 80% by weight, or, in some cases, 60 to 80% by weight, based on the total weight of the catalyst composition, of a blow catalyst, such as a morpholine; and (ii) 10 to 50% by weight, such as 20 to 50% by weight, or, in some cases, 20 to 40% by weight, based on the total weight of the catalyst composition, of a arylalkyl tertiary amine, an aryl tertiary amine, or a mixture thereof.

In certain embodiments, the catalyst composition does not include an acid-blocked amine catalyst. In certain embodiments, the isocyanate-reactive composition does not include a metal catalyst and/or any other catalyst that is not a tertiary amine catalyst.

In certain embodiments, the total amount of catalyst composition present is 1 to 10% by weight, 4.0 to 8.0% or 5.0 to 7.0% by weight, based on the total weight of the polyol blend.

Additional materials which may optionally be included in the foam-forming compositions of the present invention include: pigments, colorants, fillers, antioxidants, flame retardants, and stabilizers. Exemplary flame retardants useful in the foam-forming composition of the present invention include, but are not limited to, reactive bromine based compounds and chlorinated phosphate esters, including but not limited to, tri(2-chloroethyl)phosphate (TECP), tri(1,3-dichloro-2-propyl)phosphate, tri(1-chloro-2-propyl)phosphate (TCPP) and dimethyl propyl phosphate (DMPP).

As will be appreciated, other embodiments of this specification are directed to rigid polyurethane-foam forming compositions that comprise: (a) a diisocyanate and/or polyisocyanate (collectively "polyisocyanate"); and (b) an isocyanate-reactive composition of the type described above.

Any of the known organic polyisocyanates, modified polyisocyanates or isocyanate-terminated prepolymers made from any of the known organic isocyanates may be used. Suitable organic isocyanates include aromatic, aliphatic, and cycloaliphatic polyisocyanates and combinations thereof. Useful polyisocyanates include: diisocyanates, such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified polyisocyanates are obtained by chemical reaction of polyisocyanates. Useful modified polyisocyanates include, but are not limited to, those containing ester groups, urea groups, biuret groups, allophanate groups, carbodiimide groups, isocyanurate groups, uretdione groups and/or urethane groups. Examples of modified polyisocyanates include prepolymers containing NCO groups and having an NCO content of from 25 to 35 weight percent, such as from 29 to 34 weight percent, such as those based on polyether polyols or polyester polyols and diphenylmethane diisocyanate.

In certain embodiments, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent, due to their ability to cross-link the polyurethane.

The present specification is also directed to processes for producing rigid polyurethane foams. In such processes, an organic polyisocyanate is reacted with an isocyanate-reactive composition of the type described above. In some embodiments, the isocyanate functional component and the isocyanate-reactive composition are mixed at an isocyanate index of from 0.90 to 1.80, 0.90 to 1.50, 0.90 to 1.40, or 1.00 to 1.20.

In certain embodiments, the polyol blend of the isocyanate-reactive composition is reacted with an organic polyisocyanate in the presence of a blowing agent, water, a tertiary amine catalyst composition, a surfactant and any other optional ingredients. The rigid foams may be prepared by blending all of the components of the isocyanate-reactive composition together in a phase stable mixture, and then mixing this in the proper ratio with the organic polyisocyanate. Alternatively, one or more of the components, such as the surfactant, may be combined with the organic polyisocyanate prior to mixing it with the isocyanate-reactive composition. Other possible embodiments of the invention would include adding one or more of the components as a separate stream, together with the polyol blend and the organic polyisocyanate.

Many foam machines are designed to condition and mix only two components in the proper ratio. For use of these machines, a premix of all the components except the polyisocyanate can be advantageously employed. According to the two-component method (component A: polyisocyanate; and component B: isocyanate-reactive composition which typically includes the polyol blend, blowing agent, water, catalyst and surfactant), the components may be mixed in the proper ratio at a temperature of 5 to 50° C., such as 15 to 35° C., injected or poured into a mold having the temperature controlled to within a range of 20 to 70° C., such as 35 to 60° C. The mixture then expands to fill the cavity with the rigid polyurethane foam. This simplifies the metering and mixing of the reacting components which form the polyurethane foam-forming mixture, but requires that the isocyanate-reactive composition be phase stable.

Furthermore, the rigid polyurethane foam can be prepared in a batch or continuous process by the one-shot or quasi-prepolymer methods using any well-known foaming apparatus. The rigid polyurethane foam may be produced in the form of slab stock, moldings, cavity fillings, sprayed foam, frothed foam or laminates with other materials such as hardboard, plasterboard, plastics, paper or metal as facer substrates.

For closed-cell insulating foams, the object is to retain the blowing agent in the cells to maintain a low thermal conductivity of the insulating material, i.e., the rigid polyurethane foam. Thus, a high closed-cell content in the foam is desirable. Foams produced according to embodiments of the present specification have more than 80 percent, typically more than 85 percent, or more than 88 percent closed-cell content as measured according to ASTM D6226-15. Furthermore, the thermal conductivity of foams produced according to various embodiments of the present specification, measured at 35° F. (2° C.), is less than 0.160 BTU-in/h-ft$^2$-° F. for foam from the core of 2-inch thick panels, as measured according to ASTM C518-17.

This specification also relates to the use of the rigid polyurethane foams described herein for thermal insulation. More particularly the rigid foams can be used, for example, as an intermediate layer between substrates to form a composite article. Thus, referring now to FIG. 1, this specification is also directed to a composite articles 10 that comprise a rigid polyurethane foam core 20 as disclosed herein. The rigid polyurethane foam core includes a face 22 that is adhered to substrate 32 and a face 24 that is adhered to substrate 34. As a result, the polyurethane foam core 20 is sandwiched between substrates 32 and 34.

In certain embodiments, the substrate may be plastic (such a polypropylene resin reinforced with continuous bi-directional glass fibers or a fiberglass reinforced polyester copolymer), paper, wood, or metal, such as steel or aluminum. In some implementations, for example, the substrate may comprise a relatively thin sheet of metal, such as steel, such as those having a thickness of 0.021 inch to 0.027 inch (0.53 millimeter to 0.69 millimeter).

It is currently believed that the particular isocyanate-reactive compositions described herein are capable of producing rigid foams that have a particular combination of properties that can make them suitable for use in sandwich composites for entry doors.

First, the rigid foams can have a thermal conductivity measured at 75° F. (23.9° C.) of less than 0.160 BTU-in/h-ft$^2$-° F., for foam from the core of 2-inch thick panels, as measured according to ASTM D1622-14 at an overall foam density of 1.90 to 2.20 lb/ft$^3$ (30.4 to 35.2 kg/m$^3$) even when the amount of HCFO used in the isocyanate-reactive composition is less than 15% by weight, based on the total weight of the isocyanate-reactive composition. Second, the isocyanate-reactive composition can exhibit a long shelf life. Here, when it is stated that the isocyanate-reactive composition has a "long" shelf life of it means that after storing the isocyanate-reactive composition for 6 days at 60° C., when the isocyanate-reactive composition is combined with the polyisocyanate, the gel time of the foam produced thereby remains within 10% of the initial gel time (the gel time of such a foam if produced immediately and not after storing the isocyanate-reactive composition for 6 days at 60°) even when the isocyanate-reactive composition comprises 1.5% by weight or more of water. In some cases, this initial gel time is 100 to 240 seconds, which can be ideally suited for trailer floor applications. Third, the rigid foams can exhibit low shrinkage even at densities as low as 2.02 lb/ft$^3$, which means that the volume change of a free-rise density foam produced from the foam-forming compositions described herein is less than 14% after aging the foam for 4 weeks at each of −30° C. and 70° C. (1 atm pressure). Fourth, the foams can exhibit excellent adhesion to facer substrates typically used in the manufacture of composite elements for entry door, particularly steel. As used herein, "excellent adhesion" means that the rigid foam exhibits an adhesive strength to metal of at least 1.7 lbf/in, at least 2.0 lbf/in, in some cases at least 2.5 lbf/in, when measured according to ASTM D429-14, Method B. Such foams may also exhibit a tensile adhesion: of at least 20 psi, at least 25 psi, or, in some cases, at least 28 psi, when measured according to ASTM D1623-17, Type C.

Various aspects of the subject matter described herein are set out in the following numbered clauses:

Clause 1. An isocyanate-reactive composition, comprising: (a) a polyol blend comprising 1 to 20% by weight, based on the total weight of the polyol blend, of an amine-initiated polyether polyol having an OH number of at least 500 mg KOH/g and a functionality of 2.5 to 4; (b) a blowing agent composition comprising: (1) a HCFO; and (2) a carbon dioxide generating chemical blowing agent; and (c) a catalyst composition comprising: (1) a gel catalyst; and (2) a blow catalyst, in which (i) the gel catalyst comprises an arylalkyl tertiary amine, an aryl tertiary amine, or a mixture thereof that is present in an amount of at least 1% by weight, based on the total weight of the polyol blend; and (ii) the blow catalyst and gel catalyst are present in a relative ratio, by weight, of at least 1:1.

Clause 2. The isocyanate-reactive composition of clause 1, wherein the amine-initiated polyether polyol comprises an alkanolamine-initiated polyether polyol.

Clause 3. The isocyanate-reactive composition of clause 2, wherein the alkanolamine-initiated polyether polyol comprises the alkoxylation reaction product of an alkylene oxide with one or more initiator compounds comprising an alkanolamine represented by the formula:

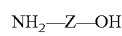

in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms, wherein the dialkylene ether radical is represented by the formula:

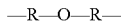

where each R represents a hydrocarbon radical having 2 to 3 carbon atoms.

Clause 4. The isocyanate-reactive composition of clause 3, wherein the alkanolamine comprises monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2,2-dimethyl propanol, 4-aminocyclohexanol, or a mixture of any two or more thereof.

Clause 5. The isocyanate-reactive composition of clause 3 or clause 4, wherein the alkylene oxide comprises ethylene oxide, propylene oxide, butylene oxide, styrene oxide, epichlorohydrin, or a mixture of any two or more thereof.

Clause 6. The isocyanate-reactive composition of one of clause 1 to clause 5, wherein the amine-initiated polyether polyol has an OH number of 500 to 900 mg KOH/g, 600 to 800 mg KOH/g, or 680 to 720 mg KOH/g.

Clause 7. The isocyanate-reactive composition of one of clause 1 to clause 6, wherein the amine-initiated polyether polyol has a functionality of 2.5 to 3.5.

Clause 8. The isocyanate-reactive composition of one of clause 1 to clause 7, wherein the amine-initiated polyether polyol is present in an amount of 5 to 20% by weight, 10 to 20% by weight, or 10 to 15% by weight, based upon the total weight of the polyol blend.

Clause 9. The isocyanate-reactive composition of one of clause 1 to clause 8, wherein the polyol blend comprises a saccharide-initiated polyether polyol that is different from the amine-initiated polyether polyol.

Clause 10. The isocyanate-reactive composition of clause 9, wherein the saccharide-initiated polyether polyol is an alkoxylation reaction product of an alkylene oxide with an initiator comprising a saccharide, such as where the alkylene oxide comprises ethylene oxide, propylene oxide, butylene oxide, styrene oxide, epichlorohydrin, or a mixtures of any to or more thereof and the saccharide comprises sucrose, sorbitol, maltitol, or a mixture of any two or more thereof.

Clause 11. The isocyanate-reactive composition of clause 10, wherein the initiator further comprises water, propylene glycol, glycerin, ethylene glycol, an ethanol amine, diethylene glycol, or a mixture of any two or more thereof.

Clause 12. The isocyanate-reactive composition of one of clause 9 to clause 11, wherein the saccharide-initiated polyether polyol has an OH number of 200 to 600 mg KOH/g, 300 to 550 mg KOH/g, 350 to 450 mg KOH/g, or 380 to 420 mg KOH/g.

Clause 13. The isocyanate-reactive composition of one of clause 9 to clause 12, wherein the saccharide-initiated polyether polyol has a functionality of 4 to 6, 4 to 5, or 4.0 to 4.5.

Clause 14. The isocyanate-reactive composition of one of clause 9 to clause 13, wherein saccharide-initiated polyether polyol is present in an amount of 20 to 99% by weight, 20 to 90% by weight, 20 to 80% by weight, 20 to 60% by weight, or 30 to 50% by weight, based on the total weight of the polyol blend.

Clause 15. The isocyanate-reactive composition of one of clause 1 to clause 14, wherein the polyol blend comprises an aliphatic triol-initiated polyether polyol that is different from the saccharide-initiated polyether polyol and amine-initiated polyether polyol.

Clause 16. The isocyanate-reactive composition of clause 15, wherein the aliphatic triol-initiated polyether polyol has an OH number of 200 to 800 mg KOH/g, 300 to 600 mg KOH/g, 400 to 500 mg KOH/g, or 450 to 500 mg KOH/g.

Clause 17. The isocyanate-reactive composition of clause 15 or clause 16 wherein the aliphatic triol-initiated polyether polyol has a functionality of from greater than 2 to 4, 2.5 to 3.5, or 3.0.

Clause 18. The isocyanate-reactive composition of one of clause 15 to clause 17, wherein the aliphatic triol-initiated polyether polyol is an alkoxylation reaction product of an alkylene oxide and an aliphatic divalent, trivalent and/or more valent alcohol (such as ethanediol, propanediol-1,2 and propanediol-1,3, diethylene glycol, dipropylene glycol, butanediol-1,4, hexanediol-1,6, glycerin, or a mixture of any two or more thereof), with the proviso that at least one trivalent alcohol is used, such as where the aliphatic triol initiated polyether polyol is an alkxylation reaction product of a polyvalent alcohol starter that comprises or consists of glycerin and an alkylene oxide comprising or consisting of propylene oxide.

Clause 19. The isocyanate-reactive composition of one of clause 15 to clause 18, wherein the aliphatic triol-initiated polyether polyol is present in an amount of 20 to 99% by weight, 20 to 90% by weight, 20 to 80% by weight, 20 to 60% by weight, or 30 to 50% by weight, based on the total weight of the polyol blend.

Clause 20. The isocyanate-reactive composition of one of clause 15 to clause 19, wherein the polyol blend comprises both saccharide-initiated polyether polyol and aliphatic triol-initiated polyether polyol, in which saccharide-initiated polyether polyol and aliphatic triol-initiated polyether polyol are present in the polyol blend in a weight ratio of 1:10 to 10:1, 1:5 to 5:1, 1:3 to 3:1, 1.2:2:1, 1.5:1.0 to 1.0:1.5 or 1.2:1.0 to 1.0:1.2.

Clause 21. The isocyanate-reactive composition of one of clause 9 to clause 14 wherein the saccharide-initiated polyether polyol and the amine-initiated polyether polyol are present in the polyol blend at a weight ratio of at least 1:1, 1:1 to 10:1, 1:1 to 5:1; 2:1 to 4:1 or 3:1 to 4.1.

Clause 22. The isocyanate-reactive composition of one of clause 15 to clause 20, wherein the aliphatic triol-initiated polyether polyol and the amine-initiated polyether polyol are present in the polyol blend at a weight ratio of at least 1:1, 1:1 to 10:1, 1:1 to 5:1; 2:1 to 4:1, or 3:1 to 4.1.

Clause 23. The isocyanate-reactive composition of one of clause 1 to clause 22, wherein the polyol blend has a weighted average functionality of 3 to 6, 3 to 5 or 3 to 4, and/or a weighted average hydroxyl number of 300 to 600 mg KOH/g, 400 to 500 mg KOH/g, or 450 to 500 mg KOH/g, and/or a weighted average molecular weight of 200 to 800 g/mol, 200 to 600 g/mol or 400 to 500 g/mol.

Clause 24. The isocyanate-reactive composition of one of clause 1 to clause 23, wherein the HCFO comprises 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers), or a mixture of any two or more thereof.

Clause 25. The isocyanate-reactive composition of one of clause 1 to clause 24, wherein the HCFO is present in an amount of at least 1% by weight, such as 5 to 30% by weight, such as 5 to 20% by weight, 5 to 15% by weight or 10 to 15% by weight, based on the total weight of the polyol blend.

Clause 26. The isocyanate-reactive composition of one of clause 1 to clause 25, wherein the carbon dioxide generating chemical blowing agent comprises water present in an amount of 0.5 to 10.0% by weight, 2 to 8% by weight, 3.0 to 7.0% by weight, or 4.0 to 6.0% by weight, based on the total weight of the polyol blend.

Clause 27. The isocyanate-reactive composition of one of clause 1 to clause 26, wherein the HCFO and the carbon dioxide generating chemical blowing agent are present in an amount of at least 90% by weight, at least 95% by weight, or at least 99% by weight, based on the total weight of the blowing agent composition.

Clause 28. The isocyanate-reactive composition of one of clause 1 to clause 27, wherein the HCFO and a carbon dioxide generating chemical blowing agent are present in the blowing agent composition at a weight ratio of at least 2:1, 2:1 to 10:1, 2:1 to 4:1 or 2:1 to 3:1.

Clause 29. The isocyanate-reactive composition of one of clause 1 to clause 28, wherein the catalyst composition comprises an arylalkyl tertiary amine comprising a N,N-dialkylbenzylamines in which each alkyl group of the N,N-dialkylbenzylamine independently contains 1 to 6 carbon atoms, such as where each alkyl group is independently methyl, ethyl, or propyl, such as where the N,N,-dialkylbenzylamine comprises N, N-dimethylbenzylamine (CAS No. 103-83-3), N,N-diethylbenzylamine, or a combination thereof.

Clause 30. The isocyanate-reactive composition of one of clause 1 to clause 29, wherein the catalyst composition comprises dibenzylethylamine, N,N-dimethylaniline, N,N-diethylaniline, N-methyl-N-ethylaniline, N,N-diisopropylaniline, or a mixture of any two or more thereof.

Clause 31. The isocyanate-reactive composition of one of clause 1 to clause 30, wherein the arylalkyl tertiary amine, aryl tertiary amine, or a mixture thereof is present in an amount of 1 to 5% by weight or 1.5 to 3.2% by weight, based on the total weight of the polyol blend.

Clause 32. The isocyanate-reactive composition of one of clause 1 to clause 31, wherein the blow catalyst comprises a morpholine, such as dimorpholinodiethylether, dimorpholinodimethylether, N-ethylmorpholine, N-methylmorpholine, or a mixture of any two or more thereof.

Clause 33. The isocyanate-reactive composition of clause 32, wherein the catalyst composition comprises: (i) 50 to 90% by weight, 50 to 80% by weight, or 60 to 80% by weight, based on the total weight of the catalyst composition, of the blow catalyst, such as a morpholine; and (ii) 10 to 50% by weight, 20 to 50% by weight, or 20 to 40% by weight, based on the total weight of the catalyst composition, of a an arylalkyl tertiary amine, an aryl tertiary amine, or a mixture thereof.

Clause 34. The isocyanate-reactive composition of one of clause 1 to clause 33, wherein the isocyanate-reactive composition does not include an acid-blocked amine catalyst, a metal catalyst and/or any catalyst that is not a tertiary amine catalyst.

Clause 35. The isocyanate-reactive composition of one of clause 1 to clause 34, wherein the total amount of the catalyst composition present in the isocyanate-reactive composition is 1 to 10% by weight, 4.0 to 8.0% or 5.0 to 7.0% by weight, based on the total weight of the polyol blend.

Clause 36. A rigid polyurethane-foam forming compositions comprising: (a) a polyisocyanate; and (b) the isocyanate-reactive composition of one of clause 1 to clause 35, such as where the polyisocyanate comprises a methylene-bridged polyphenyl polyisocyanate and/or a prepolymer of methylene-bridged polyphenyl polyisocyanates having an average functionality of from 1.8 to 3.5 or 2.0 to 3.1, isocyanate moieties per molecule and an NCO content of from 25 to 32 weight percent.

Clause 37. A process for producing a rigid polyurethane foam, comprising mixing a polyisocyanate with the isocyanate-reactive composition of one of clause 1 to clause 35 at an isocyanate index of 0.90 to 1.80, 0.90 to 1.50, 0.90 to 1.40, or 1.00 to 1.20.

Clause 38. A composite article comprising a rigid polyurethane foam core comprising a first face adhered to first metal substrate and a second face adhered to a second metal substrate, wherein the rigid polyurethane foam core comprises the reaction product of a reaction mixture comprising: (a) a polyol blend comprising 1 to 20% by weight, based on the total weight of the polyol blend, of an amine-initiated polyether polyol having an OH number of at least 500 mg KOH/g and a functionality of 2.5 to 4; (b) a blowing agent composition comprising: (1) a HCFO; and (2) a carbon dioxide generating chemical blowing agent; (c) a tertiary amine catalyst comprising an arylalkyl tertiary amine, an aryl tertiary amine, or a mixture thereof, and (d) a polyisocyanate present in an amount sufficient to provide an isocyanate index of 0.90 to 1.80, 0.90 to 1.50, 0.90 to 1.40, or 1.00 to 1.20, wherein the rigid foam exhibits an adhesive strength to at least one of the first metal substrate and the second metal substrate of at least 1.7 lbf/in when measured according to ASTM D429-14, Method B.

Clause 39. The composite article of clause 38, wherein the amine-initiated polyether polyol comprises an alkanolamine-initiated polyether polyol.

Clause 40. The composite article of clause 39, wherein the alkanolamine-initiated polyether polyol comprises the alkoxylation reaction product of an alkylene oxide with one or more initiator compounds comprising an alkanolamine represented by the formula:

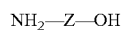

NH$_2$—Z—OH in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms, wherein the dialkylene ether radical is represented by the formula:

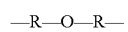

—R—O—R— where each R represents a hydrocarbon radical having 2 to 3 carbon atoms.

Clause 41. The composite article of clause 40, wherein the alkanolamine comprises monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2,2-dimethyl propanol, 4-aminocyclohexanol, or a mixture of any two or more thereof.

Clause 42. The composite article of clause 40 or clause 41, wherein the alkylene oxide comprises ethylene oxide, propylene oxide, butylene oxide, styrene oxide, epichlorohydrin, or a mixture of any two or more thereof.

Clause 43. The composite article of one of clause 38 to clause 42, wherein the amine-initiated polyether polyol has an OH number of 500 to 900 mg KOH/g, 600 to 800 mg KOH/g, or 680 to 720 mg KOH/g.

Clause 44. The composite article of one of clause 38 to clause 43, wherein the amine-initiated polyether polyol has a functionality of 2.5 to 3.5.

Clause 45. The composite article of one of clause 38 to clause 44, wherein the amine-initiated polyether polyol is present in an amount of 5 to 20% by weight, 10 to 20% by weight, or 10 to 15% by weight, based upon the total weight of the polyol blend.

Clause 46. The composite article of one of clause 38 to clause 45, wherein the polyol blend comprises a saccharide-initiated polyether polyol that is different from the amine-initiated polyether polyol.

Clause 47. The composite article of clause 46, wherein the saccharide-initiated polyether polyol is an alkoxylation reaction product of an alkylene oxide with an initiator comprising a saccharide, such as where the alkylene oxide comprises ethylene oxide, propylene oxide, butylene oxide, styrene oxide, epichlorohydrin, or a mixtures of any to or more thereof and the saccharide comprises sucrose, sorbitol, maltitol, or a mixture of any two or more thereof.

Clause 48. The composite article of clause 47, wherein the initiator further comprises water, propylene glycol, glycerin, ethylene glycol, an ethanol amine, diethylene glycol, or a mixture of any two or more thereof.

Clause 49. The composite article of one of clause 46 to clause 48, wherein the saccharide-initiated polyether polyol has an OH number of 200 to 600 mg KOH/g, 300 to 550 mg KOH/g, 350 to 450 mg KOH/g, or 380 to 420 mg KOH/g.

Clause 50. The composite article of one of clause 46 to clause 49, wherein the saccharide-initiated polyether polyol has a functionality of 4 to 6, 4 to 5, or 4.0 to 4.5.

Clause 51. The composite article of one of clause 46 to clause 50, wherein saccharide-initiated polyether polyol is present in an amount of 20 to 99% by weight, 20 to 90% by weight, 20 to 80% by weight, 20 to 60% by weight, or 30 to 50% by weight, based on the total weight of the polyol blend.

Clause 52. The composite article of one of clause 38 to clause 51, wherein the polyol blend comprises an aliphatic triol-initiated polyether polyol that is different from the saccharide-initiated polyether polyol and amine-initiated polyether polyol.

Clause 53. The composite article of clause 52, wherein the aliphatic triol-initiated polyether polyol has an OH number of 200 to 800 mg KOH/g, 300 to 600 mg KOH/g, 400 to 500 mg KOH/g, or 450 to 500 mg KOH/g.

Clause 54. The composite article of clause 52 or clause 53 wherein the aliphatic triol-initiated polyether polyol has a functionality of from greater than 2 to 4, 2.5 to 3.5, or 3.0.

Clause 55. The composite article of one of clause 52 to clause 54, wherein the aliphatic triol-initiated polyether polyol is an alkoxylation reaction product of an alkylene oxide and an aliphatic divalent, trivalent and/or more valent alcohol (such as ethanediol, propanediol-1,2 and propanediol-1,3, diethylene glycol, dipropylene glycol, butanediol-1,4, hexanediol-1,6, glycerin, or a mixture of any two or more thereof), with the proviso that at least one trivalent alcohol is used, such as where the aliphatic triol initiated polyether polyol is an alkxylation reaction product of a polyvalent alcohol starter that comprises or consists of glycerin and an alkylene oxide comprising or consisting of propylene oxide.

Clause 56. The composite article of one of clause 52 to clause 55, wherein the aliphatic triol-initiated polyether polyol is present in an amount of 20 to 99% by weight, 20 to 90% by weight, 20 to 80% by weight, 20 to 60% by weight, or 30 to 50% by weight, based on the total weight of the polyol blend.

Clause 57. The composite article of one of clause 52 to clause 56, wherein the polyol blend comprises both saccharide-initiated polyether polyol and aliphatic triol-initiated polyether polyol, in which saccharide-initiated polyether polyol and aliphatic triol-initiated polyether polyol are present in the polyol blend in a weight ratio of 1:10 to 10:1, 1:5 to 5:1, 1:3 to 3:1, 1.2:2:1, 1.5:1.0 to 1.0:1.5 or 1.2:1.0 to 1.0:1.2.

Clause 58. The composite article of one of clause 52 to clause 57 wherein the saccharide-initiated polyether polyol and the amine-initiated polyether polyol are present in the polyol blend at a weight ratio of at least 1:1, 1:1 to 10:1, 1:1 to 5:1; 2:1 to 4:1 or 3:1 to 4.1.

Clause 59. The composite article of one of clause 52 to clause 58, wherein the aliphatic triol-initiated polyether polyol and the amine-initiated polyether polyol are present in the polyol blend at a weight ratio of at least 1:1, 1:1 to 10:1, 1:1 to 5:1; 2:1 to 4:1, or 3:1 to 4.1.

Clause 60. The composite article of one of clause 38 to clause 59, wherein the polyol blend has a weighted average functionality of 3 to 6, 3 to 5 or 3 to 4, and/or a weighted average hydroxyl number of 300 to 600 mg KOH/g, 400 to 500 mg KOH/g, or 450 to 500 mg KOH/g, and/or a weighted average molecular weight of 200 to 800 g/mol, 200 to 600 g/mol or 400 to 500 g/mol.

Clause 61. The composite article of one of clause 38 to clause 60, wherein the HCFO comprises 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers), or a mixture of any two or more thereof.

Clause 62. The composite article of one of clause 38 to clause 61, wherein the HCFO is present in an amount of 1% by weight, such as 5 to 30% by weight, such as 5 to 20% by weight, 5 to 15% by weight or 10 to 15% by weight, based on the total weight of the polyol blend.

Clause 63. The composite article of one of clause 38 to clause 62, wherein the carbon dioxide generating chemical blowing agent comprises water present in an amount of 0.5 to 10.0% by weight, 2 to 8% by weight, 3.0 to 7.0% by weight, or 4.0 to 6.0% by weight, based on the total weight of the polyol blend.

Clause 64. The composite article of one of clause 38 to clause 63, wherein the HCFO and the carbon dioxide generating chemical blowing agent are present in an amount of at least 90% by weight, at least 95% by weight, or at least 99% by weight, based on the total weight of the blowing agent composition.

Clause 65. The composite article of one of clause 38 to clause 64, wherein the HCFO and a carbon dioxide generating chemical blowing agent are present in the blowing agent composition at a weight ratio of at least 2:1, 2:1 to 10:1, 2:1 to 4:1 or 2:1 to 3:1.

Clause 66. The composite article of one of clause 38 to clause 65, wherein the tertiary amine catalyst comprises an arylalkyl tertiary amine comprising a N,N-dialkylbenzylamines in which each alkyl group of the N,N-dialkylbenzylamine independently contains 1 to 6 carbon atoms, such as where each alkyl group is independently methyl, ethyl, or propyl, such as where the N,N,-dialkylbenzylamine comprises N, N-dimethylbenzylamine (CAS No. 103-83-3), N,N-diethylbenzylamine, or a combination thereof.

Clause 67. The composite article of one of clause 38 to clause 66, wherein the tertiary amine catalyst comprises dibenzylethylamine, N,N-dimethylaniline, N,N-diethylaniline, N-methyl-N-ethylaniline, N,N-diisopropylaniline, or a mixture of any two or more thereof.

Clause 68. The composite article of one of clause 38 to clause 67, wherein the arylalkyl tertiary amine, aryl tertiary amine, or a mixture thereof is present in an amount of at least 1% by weight, such as 1 to 5% by weight, or 1.5 to 3.2% by weight, based on the total weight of the polyol blend.

Clause 69. The composite article of one of clause 38 to clause 68, wherein the tertiary amine catalyst further comprises a blow catalyst, such as where the blow catalyst comprises a morpholine, such as dimorpholinodiethylether, dimorpholinodimethylether, N-ethylmorpholine, N-methylmorpholine, or a mixture of any two or more thereof.

Clause 70. The composite article of clause 69, wherein the blow catalyst and the arylalkyl tertiary amine, an aryl tertiary amine, or mixture thereof are present in a relative ratio, by weight, of at least 1:1, such as where the tertiary amine catalyst comprises: (i) 50 to 90% by weight, 50 to 80% by weight, or 60 to 80% by weight, based on the total weight of tertiary amine catalyst, of the blow catalyst, such as morpholine; and (ii) 10 to 50% by weight, 20 to 50% by weight, or 20 to 40% by weight, based on the total weight of tertiary amine catalyst, of the arylalkyl tertiary amine, an aryl tertiary amine, or mixture thereof.

Clause 71. The composite article of one of clause 38 to clause 70, wherein the reaction mixture does not include an acid-blocked amine catalyst, a metal catalyst and/or any catalyst that is not a tertiary amine catalyst.

Clause 72. The composite article of one of clause 38 to clause 71, wherein the total amount of tertiary amine catalyst present is 1 to 10% by weight, 4.0 to 8.0% or 5.0 to 7.0% by weight, based on the total weight of the polyol blend.

Clause 73. The composite article of one of clause 38 to clause 72, wherein the rigid polyurethane foam has a closed-cell content of more than 80 percent, more than 85 percent, or more than 88 percent, measured according to ASTM D6226-15.

Clause 74. The composite article of one of clause 38 to clause 73, wherein the rigid polyurethane foam has a thermal conductivity, measured at 35° F. (2° C.), of less than 0.160 BTU-in/h-ft$^2$-° F. for foam from the core of a 2-inch thick panel, measured according to ASTM C518-17.

Clause 75. The composite article of one of clause 38 to clause 74, wherein the first substrate and the second substrate comprise metal, such as steel, such as a steel sheet having a thickness of 0.021 inch to 0.027 inch (0.53 millimeter to 0.69 millimeter).

Clause 76. The composite article of one of clause 38 to clause 75, wherein the rigid polyurethane foam exhibits an adhesive strength to metal of at least 2.0 lbf/in or at least 2.5 lbf/in, when measure according to ASTM D429-14, Method B.

Clause 77. The composite article of one of clause 38 to clause 76, wherein the rigid polyurethane foam exhibits a tensile adhesion of at least 20 psi, at least 25 psi, or at least 28 psi, when measured according to ASTM D1623-17, Type C.

Clause 78. A door comprising the composite article of one of clause 38 to clause 77.

The non-limiting and non-exhaustive examples that follow are intended to further describe various non-limiting and non-exhaustive embodiments without restricting the scope of the embodiments described in this specification.

EXAMPLES

Foam-forming compositions were prepared using the ingredients and amounts (in parts by weight) set forth in the Table below. The following materials were used:

POLYOL 1: a glycerin-initiated propylene oxide-based triol having an OH number of 445-495 mg KOH/g;

POLYOL 2: a sucrose/glycerin/propylene glycol/water-initiated polyether polyol (100% propylene oxide as the alkylene oxide) having an OH number of 390-430 mg KOH/g and a functionality of 4.28;

POLYOL 3: a monoethanolamine-initiated polyether polyol having an OH number of 685 to 715, a functionality of 3, prepared by propoxylating monoethanolamine;

POLYOL 4: a sucrose/propylene glycol/water-initiated polyether polyol (100% propylene oxide as the alkylene oxide) having an OH number of 450-490 mg KOH/g and a functionality of 5.24;

POLYOL 5: A 1,000 molecular weight polypropylene oxide based diol, hydroxyl number 107.4-115.4;

SURF 1: TEGOSTAB B-8465 commercially available from Evonik;

SURF 2: TEGOSTAB B-8443 commercially available from Evonik

SURF 3: TEGOSTAB B-8871 commercially available from Evonik

SURF 4: TEGOSTAB B-8523 commercially available from Evonik

SURF 5: TEGOSTAB B-8433 commercially available from Evonik

CAT 1: N,N-benzyldimethylamine (ADDOCAT® DB from Lanxess);

CAT 2: tetramethylethylenediamine (RC 6090 from Rhein Chemie);

CAT 3: 2,2'-dimorpholinodiethylether (JEFFCAT® DMDEE from Huntsman);

CAT 4: 1,2-dimethylimidazole (DABCO® 2040 from Evonik);

CAT 5: potassium octoate catayst (DABCO® K-15 from Air Products);
CAT 6: N-methylmorpholine (JEFFCAT® NMM from Huntsman);
CAT 7: 2-Hydroxypropyl)trimethylammonium formate (DABCO® TMR-2 from Evonik)
HFC: 1,1,1,3,3-Pentafluoropropane (ENOVATE® 245fa from Honeywell);
HCFO: trans-1-Chloro-3,3,3-trifluoropropene (Solstice® LBA from Honeywell);
PUD: anionic high-molecular weight polyurethane dispersion (DISPERCOLL® U 8755 from Covestro);
AD PRO: Adhesion promoter, NIAX Additive AP-01 from Momentive; and
ISO: polymeric diphenylmethane diisocyanate (pMDI); NCO weight 31.5%; viscosity 200 mPa·s @25° C.; equivalent weight 133; functionality 2.8 (MONDUR® MR from Covestro).

In each case, a masterbatch was prepared by mixing the polyols, catalysts, surfactant, water, and blowing agents in the amounts indicated in Tables 1-5. Foams were prepared by mixing, via air driven hand mixer, the masterbatch with the amount of isocyanate indicated in Tables 1-5 for 5 seconds and pouring the mixture into an 83 ounce paper cup. The individual liquids were maintained at 10° C. prior to mixing. The cream time, gel time, and free rise density (FRD) were recorded and noted in Tables 1-5. Reported results represent the average results of three replicate experiments.

The isocyanate and masterbatch mixture was also poured into a 25 inch×13 inch×2 inch metal mold, containing steel facer material, heated to 49° C. The foam was allowed to react within the metal mold for 5 minutes before removing. Composite panels were produced at 10% overpack of a minimum fill panel. The resultant composite panel was then cut into 12 inch×3 inch sections for 90 degree peel adhesion testing per ASTM D429-14, Method B and 2 inch×2 inch sections for tensile adhesion measurements according to ASTM D1623-17, Type C. The results for adhesion testing are noted in Tables 1-5.

Foam produced from Example 3 was evaluated for shelf-life stability. For shelf life, the foam was considered shelf stable if the gel time and free-rise density of the foam after storing the isocyanate-reactive composition for 6 days at 60° C. or longer was within 10% of the initial gel time and 5% of the initial foam free-rise density (the gel time and free-rise density of such a foam if produced immediately and not after storing the isocyanate-reactive composition for 6 days at 60° C.). Results are in Table 7.

Foam from an entry door produced using a formulation matching that of Example 3 was evaluated for dimensional stability. Dimensional stability was assessed by measuring the volume change of a free-rise density foam after aging the foam for a maximum of 4 weeks at the conditions noted in Table 6 with a change of less than 12% volume. Results are in Table 6.

In the following Tables, Examples 3-5 are the inventive examples.

TABLE 1

| | Example Number | | | | | | | | | |
|---|---|---|---|---|---|---|---|---|---|---|
| Ingredient | 1 | 2 | 3 | 4 | 5 | 6 | 7 | 8 | 9 | 10 |
| POLYOL 1 | 49.13 | 47 | 35 | 34.5 | 34 | 35 | 50 | 51 | 35 | 35.3 |
| POLYOL 2 | 35.01 | 32.73 | 35 | 35 | 35 | 34.5 | 17.5 | 17 | 35.4 | 35 |
| POLYOL 3 | — | — | 10 | 10 | 10 | 10 | 13.5 | 13.5 | 10 | 10 |
| SURF 1 | 1.99 | 1.4 | 2 | 2 | 2 | 2 | 2 | 2 | 2 | 2 |
| CAT 1 | 1.24 | 1.24 | 1.5 | 2 | 2.5 | — | — | — | — | — |
| CAT 2 | 1.24 | 1.24 | — | — | — | — | — | — | — | — |
| CAT 3 | — | — | 3 | 3 | 3 | 2.5 | 2 | 2 | 1.5 | 2.2 |
| CAT 4 | — | — | — | — | — | 2.5 | 1 | 0.6 | 2 | 1 |
| CAT 6 | — | — | — | — | — | — | — | — | 0.5 | 0.5 |
| Water | 3.77 | 3.77 | 3.6 | 3.6 | 3.6 | 3.6 | 4 | 4 | 3.6 | 4 |
| HFC | 7.62 | 7.62 | — | — | — | — | — | — | — | — |
| HCFO | — | — | 9.9 | 9.9 | 9.9 | 9.9 | 10 | 9.9 | 10 | 10 |
| AD PRO | — | 5 | — | — | — | — | — | — | — | — |
| Total Parts | 100 | 100 | 100 | 100 | 100 | 100 | 100 | 100 | 100 | 100 |
| ISO Ratio | 154/100 | 156/100 | 158/100 | 157/100 | 152/100 | 156/100 | 160/100 | 177/100 | 155/100 | 162/100 |
| Index | 1.1 | 1.1 | 1.1 | 1.1 | 1.1 | 1.1 | 1 | 1.1 | 1.1 | 1.1 |
| Cream (sec) | 26 | 21 | 16 | 16 | 17 | 16 | 22 | 21 | 20 | 18 |
| Gel time (sec) | 97 | 92 | 117 | 85 | 96 | 60 | 110 | 127 | 87 | 100 |
| FRD (pcf) | 1.61 | 1.59 | 1.62 | 1.60 | 1.57 | 1.59 | 1.51 | 1.60 | 1.64 | 1.53 |
| 90° Peel Adhesion (lbf/in) | 1.73 | 0.610 | 2.545 | 1.715 | 2.04 | 0.51 | 0.935 | 1.07 | 0.82 | 0.795 |
| Tensile Adhesion (psi) | 7.95 | 11.78 | 29.72 | 28.73 | 23.58 | 6.483 | 10.95 | 9.317 | 7.05 | 8.833 |

TABLE 2

| | Example Number | | | | | | | | | |
|---|---|---|---|---|---|---|---|---|---|---|
| Ingredient | 11 | 12 | 13 | 14 | 15 | 16 | 17 | 18 | 19 | 20 |
| POLYOL 1 | 34.5 | 34.5 | 34 | 35 | 35 | 35 | 35 | 49 | 38.89 | 39.48 |
| POLYOL 2 | 34.5 | 34.5 | 34 | 35 | 34.5 | 35 | 35 | 34.87 | 34.89 | 34.89 |
| POLYOL 3 | 10 | 10 | 10 | 10 | 10 | 10 | 10 | — | 10 | 10 |
| SURF 1 | 2 | 2 | 2 | 2 | 2 | 2 | 2 | 1.98 | 1.98 | 1.98 |

TABLE 2-continued

| Ingredient | 11 | 12 | 13 | 14 | 15 | 16 | 17 | 18 | 19 | 20 |
|---|---|---|---|---|---|---|---|---|---|---|
| CAT 1 | — | — | — | — | — | — | — | 0.50 | 0.20 | 2 |
| CAT 3 | 3 | 3 | 3 | 3 | 3 | 3 | 3 | 2.18 | 2.18 | 2.18 |
| CAT 4 | 2 | 1 | 2 | 1 | 1.5 | 1 | 1 | 1.00 | 1 | 1 |
| CAT 6 | 0.50 | 1.5 | 1.5 | 0.5 | 0.5 | 0.5 | 0.5 | — | — | — |
| Water | 3.6 | 3.6 | 3.6 | 3.6 | 3.6 | 3.6 | 3.6 | 3.53 | 3.53 | 3.53 |
| HCFO | 9.9 | 9.9 | 9.9 | 9.9 | 9.9 | 9.9 | 9.9 | 6.94 | 6.94 | 6.94 |
| Total Parts | 100 | 100 | 100 | 100 | 100 | 100 | 100 | 100 | 99.61 | 102 |
| ISO Ratio | 155/100 | 155/100 | 155/100 | 155/100 | 155/100 | 178/100 | 149/100 | 153.4/100 | 159.1/100 | 159.1/100 |
| Index | 1.1 | 1.1 | 1.1 | 1.1 | 1.1 | 1.2 | 1 | 1.1 | 1.1 | 1 |
| Cream (sec) | 15 | 16 | 15 | 18 | 17 | 17 | 17 | 19 | 20 | 19 |
| Gel time (sec) | 70 | 81 | 65 | 90 | 77 | 95 | 88 | 102 | 99 | 83 |
| FRD (pcf) | 1.59 | 1.56 | 1.57 | 1.59 | 1.63 | 1.70 | 1.53 | 1.71 | 1.71 | 1.76 |
| 90° Peel Adhesion (lbf/in) | 0.75 | 0.815 | 0.75 | 0.75 | 0.895 | 1.22 | 0.82 | 0.85 | 1.10 | 0.895 |
| Tensile Adhesion (psi) | 6.917 | 7.75 | 6.683 | 8.833 | 10.18 | 19.3 | 8.433 | 5.62 | 9.83 | 12.3 |

TABLE 3

| Ingredient | 21 | 22 | 23 | 24 | 25 | 26 | 27 | 28 | 29 | 30 |
|---|---|---|---|---|---|---|---|---|---|---|
| POLYOL 1 | 32.5 | 25 | 39.48 | 34.48 | 28.9 | 49 | 35 | 35 | 50 | 28.9 |
| POLYOL 2 | 32.5 | 25 | 32.52 | — | — | 14.6 | — | — | 17.1 | 28.9 |
| POLYOL 3 | 10 | 10 | 10.0 | 15.00 | 22 | 13.5 | 10.5 | 10.5 | 13.5 | 22 |
| POLYOL 4 | — | — | — | 34.89 | 28.9 | — | 35 | 35 | — | — |
| POLYOL 5 | 5 | 20 | — | — | — | — | — | — | — | — |
| SURF 1 | 2 | 2 | 1.98 | 1.98 | 2 | 1.4 | 2 | 2 | 2 | 2 |
| CAT 2 | — | — | — | — | — | — | — | — | — | — |
| CAT 3 | 3 | 3 | 2.18 | 2.18 | 3 | 2 | 2.2 | 3 | 2 | 3 |
| CAT 4 | 1 | 1 | 1.00 | 1.00 | 1 | 0.6 | 1 | 1 | 1 | 1 |
| CAT 6 | 0.5 | 0.5 | 0.50 | — | 0.6 | — | — | — | — | 0.6 |
| CAT 7 | — | — | — | — | — | — | 0.3 | 0.3 | 0.40 | — |
| Water | 3.6 | 3.6 | — | 3.53 | 3.6 | 4 | 4 | 3.6 | 4 | 3.6 |
| HCFO | 9.9 | 9.9 | 6.94 | 6.94 | 10 | 9.9 | 10 | 9.9 | 10 | 10 |
| AD PRO | — | — | — | — | — | 5 | — | — | — | — |
| PUD | — | — | 5.40 | — | — | — | — | — | — | — |
| Total Parts | 100 | 100 | 100 | 100 | 100 | 100 | 100 | 100.3 | 100 | 100 |
| Iso Ratio | 160/100 | 138/100 | 159.1/100 | 172/100 | 172/100 | 171/100 | 173/100 | 166/100 | 160/100 | 167/100 |
| Index | 1.1 | 1.1 | 1.1 | 1.1 | 1.1 | 1.1 | 1.1 | 1.1 | 1 | 1.1 |
| Cream (sec) | 17 | 17 | 23 | 22 | 17 | 22 | 21 | 18 | 22 | 17 |
| Gel time (sec) | 87 | 81 | 111 | 107 | 86 | 113 | 113 | 100 | 104 | 82 |
| FRD (pcf) | 1.66 | 1.52 | 2.10 | 1.92 | 1.67 | 1.58 | 1.61 | 1.69 | 1.50 | 1.66 |
| 90° Peel Adhesion (lbf/in) | 1.295 | 0.965 | 1.265 | 1.310 | 0.605 | 0.94 | 0.72 | 0.975 | 0.81 | 0.445 |
| Tensile Adhesion (psi) | 21.32 | 11.42 | 10.58 | 12.23 | 8.917 | 15.75 | 8.567 | 10.63 | 6.433 | 9.45 |

TABLE 4

| Ingredient | 31 | 32 | 33 | 34 |
|---|---|---|---|---|
| POLYOL 1 | 47 | 48.99 | 43.99 | 38.99 |
| POLYOL 2 | 33.5 | 34.89 | 34.89 | 34.89 |
| POLYOL 3 | — | — | 5.00 | 10.00 |
| SURF 1 | 2 | 1.98 | 1.98 | 1.98 |
| CAT 3 | 2 | 2.18 | 2.18 | 2.18 |
| CAT 4 | 1 | 0.99 | 0.99 | 0.99 |
| CAT 5 | 0.5 | 0.50 | 0.50 | 0.50 |
| Water | 4 | 3.53 | 3.53 | 3.53 |
| HCFO | 10 | 6.94 | 6.94 | 6.94 |
| Total Parts | 100 | 100 | 100 | 100 |
| ISO Ratio | 156/100 | 156/100 | 158.9/100 | 161.9/100 |
| Index | 1.1 | 1.1 | 1.1 | 1.1 |
| Cream (sec) | 21 | 19 | 20 | 19 |
| Gel time (sec) | 113 | 101 | 101 | 97 |
| FRD (pcf) | 1.49 | 1.76 | 1.78 | 1.81 |
| 90° Peel Adhesion (lbf/in) | 0.885 | 0.93 | 1.10 | 1.24 |
| Tensile Adhesion (psi) | 7.617 | 12.30 | 10.37 | 6.42 |

TABLE 5

| | Example Number | | | | |
|---|---|---|---|---|---|
| Ingredient | 35 | 36 | 37 | 38 | 39 |
| POLYOL 1 | 34 | 35 | 35 | 35 | 35 |
| POLYOL 2 | 34 | 35 | 35 | 35 | 35 |
| POLYOL 3 | 10 | 10 | 10 | 10 | 10 |
| Glycerine | 2 | — | — | — | — |
| SURF 1 | 2 | — | — | — | — |
| SURF 2 | — | 2 | — | — | — |
| SURF 3 | — | — | 2 | 1 | — |
| SURF 4 | — | — | — | 1 | — |
| SURF 5 | — | — | — | — | 2 |
| CAT 3 | 3 | 3 | 3 | 3 | 3 |
| CAT 4 | 1 | 1 | 1 | 1 | 1 |
| CAT 6 | 0.5 | 0.5 | 0.5 | 0.5 | 0.5 |
| Water | 3.6 | 3.6 | 3.6 | 3.6 | 3.6 |
| HCFO | 9.9 | 9.9 | 9.9 | 9.9 | 9.9 |
| Total Parts | 100 | 100 | 100 | 100 | 100 |
| ISO Ratio | 162/100 | 155/100 | 155/100 | 155/100 | 155/100 |
| Index | 1.1 | 1.1 | 1.1 | 1.1 | 1.1 |
| Cream (sec) | 18 | 17 | 17 | 15 | 17 |
| Gel time (sec) | 89 | 89 | 85 | 86 | 88 |
| FRD (pcf) | 1.63 | 1.60 | 1.59 | 1.59 | 1.6 |
| 90° Peel Adhesion (lbf/in) | 1.08 | 1.045 | 1.03 | 0.855 | |
| Tensile Adhesion (psi) | 7.05 | 10.85 | 13.52 | 9.517 | |

TABLE 6

| | % Change in Volume | | | |
|---|---|---|---|---|
| Condition | 1 Day | 7 Day | 14 Day | 28 Day |
| −30° C. | 0.0 | −0.3 | 0.0 | 0.1 |
| 70° C. | −1.1 | −1.8 | −1.1 | −0.9 |
| 70° C. @ 95% RH | 1.9 | 0.2 | 0.5 | 1 |

TABLE 7

| Time aged | Gel Time (sec) | FRD (pcf) |
|---|---|---|
| Initial | 110 | 1.58 |
| 2 Day | 117 | 1.58 |
| 4 Day | 119 | 1.57 |
| 6 Day | 117 | 1.53 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate-reactive composition, comprising:
   (a) a polyol blend comprising 1 to 20% by weight, based on the total weight of the polyol blend, of an alkanolamine-initiated polyether polyol having an OH number of at least 500 mg KOH/g and a functionality of 2.5 to 4, in which the alkanolamine-initiated polyether polyol is a reaction product of an alkanolamine-initiator compound and an alkylene oxide, with the proviso that the alkylene oxide does not include ethylene oxide;
   (b) a blowing agent composition comprising:
      (1) a hydrochlorofluoroolefin; and
      (2) a carbon dioxide generating chemical blowing agent; and
   (c) a catalyst composition comprising:
      (1) a gel catalyst comprising an arylalkyl tertiary amine, an aryl tertiary amine, or a mixture thereof that is present in an amount of at least 1% by weight, based on the total weight of the polyol blend; and
      (2) a blow catalyst, wherein the blow catalyst and gel catalyst are present in a relative ratio, by weight, of at least 1:1.

2. The isocyanate-reactive composition of claim 1, wherein the alkanolamine-initiated polyether polyol has an OH number of 500 to 900 mg KOH/g and a functionality of 2.5 to 3.5.

3. The isocyanate-reactive composition of claim 1, wherein the polyol blend comprises a saccharide-initiated polyether polyol that is different from the alkanolamine-initiated polyether polyol and has an OH number of 200 to 600 mg KOH/g and a functionality of 4 to 6, wherein the saccharide-initiated polyether polyol and the amine-initiated polyether polyol are present in the polyol blend at a weight ratio of 1:1 to 10:1.

4. The isocyanate-reactive composition of claim 3, wherein the polyol blend comprises an aliphatic triol-initiated polyether polyol that is different from the alkanolamine-initiated polyether polyol, and which has an OH number of 200 to 800 mg KOH/g and a functionality of from greater than 2 to 4, wherein the aliphatic triol-initiated polyether polyol and the alkanolamine-initiated polyether polyol are present in the polyol blend at a weight ratio of 1:1 to 10:1.

5. The isocyanate-reactive composition of claim 1, wherein the hydrochlorofluoroolefin comprises 1-chloro-3,3,3-trifluoropropene present in an amount of 5 to 30% by weight, based on the total weight of the polyol blend.

6. The isocyanate-reactive composition of claim 1, wherein the carbon dioxide generating chemical blowing agent comprises water present in an amount of 2 to 8% by weight, based on the total weight of the polyol blend, and wherein the hydrochlorofluoroolefin and water are present in an amount of at least 90% by weight, based on the total weight of the blowing agent composition.

7. The isocyanate-reactive composition of claim 1, wherein the gel catalyst comprises a N,N-dialkylbenzylamine in which each alkyl group of the N,N-dialkylbenzylamine independently contains 1 to 6 carbon atoms.

8. The isocyanate-reactive composition of claim 7, wherein the N,N,-dialkylbenzylamine comprises N, N-dimethylbenzylamine present in an amount of 1 to 5% by weight, based on the total weight of the polyol blend.

9. The isocyanate-reactive composition of claim 1, wherein the blow catalyst comprises a morpholine.

10. A rigid polyurethane foam-forming composition comprising:
(a) a polyisocyanate; and
(b) the isocyanate-reactive composition of claim 1.

11. A process for producing a rigid polyurethane foam, comprising mixing a polyisocyanate with the isocyanate-reactive composition of claim 1 at an isocyanate index of 0.90 to 1.80.

12. The isocyanate-reactive composition of claim 1, wherein the alkylene oxide consists of propylene oxide.

13. The isocyanate-reactive composition of claim 1, wherein the polyol blend further comprises 20 to 99% by weight, based on the total weight of the polyol blend, of an aliphatic triol-initiated polyether polyol that is different from the alkanolamine-initiated polyether polyol and that has an OH number of 450 to 800 mg KOH/g and a functionality of 2.5 to 3.5.

14. The isocyanate-reactive composition of claim 13, wherein the aliphatic triol-initiated polyether polyol that is different from the alkanolamine-initiated polyether polyol and that has an OH number of 450 to 800 mg KOH/g and a functionality of 2.5 to 3.5 is present in an amount of 30 to 99% by weight, based on the total weight of the polyol blend.

15. The isocyanate-reactive composition of claim 14, wherein the aliphatic triol-initiated polyether polyol that is different from the alkanolamine-initiated polyether polyol and that has an OH number of 450 to 800 mg KOH/g and a functionality of 2.5 to 3.5 is present in an amount of 30 to 50% by weight, based on the total weight of the polyol blend.

* * * * *